US010013017B2

(12) United States Patent
Bernardy et al.

(10) Patent No.: US 10,013,017 B2
(45) Date of Patent: Jul. 3, 2018

(54) REDUCED DEAD BAND FOR SINGLE JOYSTICK DRIVE VEHICLE CONTROL (71) Applicant: Robert Bosch GmbH, Stuttgart (DE)

(72) Inventors: Steven John Bernardy, Wooster, OH (US); Michael Gene Kandel, Walnut Creek, OH (US)

(73) Assignee: Robert Bosch GmbH, Stuttgart (DE)

(*) Notice: Subject to any disclaimer, the term of this patent is extended or adjusted under 35 U.S.C. 154(b) by 64 days.

(21) Appl. No.: 14/912,584

(22) PCT Filed: Sep. 9, 2014

(86) PCT No.: PCT/US2014/054795
§ 371 (c)(1),
(2) Date: Feb. 17, 2016

(87) PCT Pub. No.: WO2015/035389
PCT Pub. Date: Mar. 12, 2015

(65) Prior Publication Data
US 2016/0202721 A1 Jul. 14, 2016

Related U.S. Application Data (60) Provisional application No. 61/875,465, filed on Sep. 9, 2013.

(51) Int. Cl.
*G05G 9/047* (2006.01)
*G06F 3/038* (2013.01)
(Continued)

(52) U.S. Cl.
CPC ............ *G05G 9/047* (2013.01); *A63F 13/20* (2014.09); *A63F 13/24* (2014.09); *B66C 13/40* (2013.01);
(Continued)

(58) Field of Classification Search
CPC ......... G05G 9/047; G05G 2009/04703; G05G 2009/0474; G05G 2009/04751;
(Continued)

(56) References Cited

U.S. PATENT DOCUMENTS 5,963,196 A * 10/1999 Nishiumi ................ A63F 13/02
345/161
2005/0195166 A1* 9/2005 Cooper .................. G05G 9/047
345/161
(Continued)

FOREIGN PATENT DOCUMENTS

CN 1067482 C 6/2001
EP 2343236 7/2011
(Continued)

OTHER PUBLICATIONS

International Search Report and Written Opinion for Application No. PCT/US2014/054795 dated Dec. 10, 2014 (12 pages).
(Continued)

*Primary Examiner* — Thomas G Black
*Assistant Examiner* — Sara J Lewandroski
(74) *Attorney, Agent, or Firm* — Michael Best & Friedrich LLP (57) ABSTRACT A system and a method for controlling a vehicle with a joystick that includes implementing at least one dead band for the joystick. The dead band prevents movement of the vehicle when the joystick is within the dead band areas. The dead band areas are adjustable and take a plurality of shapes including having gaps between areas of the dead band areas. These dead bands allow for smooth operation of a vehicle by suppressing the control signal of the joystick for unintentional movements of the joystick by the operator. The
(Continued)

adjustability of the dead band allows for adjustment based on the joystick type, the vehicle type, and the control desired.

11 Claims, 6 Drawing Sheets

(51) Int. Cl.
| | | |
|---|---|---|
| B66C 13/40 | (2006.01) | |
| E02F 9/20 | (2006.01) | |
| G05D 1/00 | (2006.01) | |
| G06F 3/0338 | (2013.01) | |
| A63F 13/24 | (2014.01) | |
| A63F 13/20 | (2014.01) | |

(52) U.S. Cl.
CPC ......... *E02F 9/2004* (2013.01); *G05D 1/0016* (2013.01); *G06F 3/038* (2013.01); *G06F 3/0338* (2013.01); *G06F 3/0383* (2013.01); *G05G 2009/0474* (2013.01); *G05G 2009/04774* (2013.01)

(58) Field of Classification Search
CPC .. A63F 2009/2407; G06F 3/033; G06F 3/038; G06F 3/0338; G06F 3/0354
See application file for complete search history.

(56) References Cited

U.S. PATENT DOCUMENTS

| | | | | |
|---|---|---|---|---|
| 2006/0136092 A1* | 6/2006 | Gharsalli | ............... | G05G 9/047 |
| | | | | 700/224 |
| 2009/0038282 A1* | 2/2009 | Avalle | .................. | A01D 51/002 |
| | | | | 56/10.8 |
| 2010/0023227 A1* | 1/2010 | Storer | ................... | E02F 3/6481 |
| | | | | 701/48 |
| 2012/0123655 A1 | 5/2012 | Kurata | | |
| 2012/0325575 A1 | 12/2012 | Jurkiewicz | | |
| 2014/0024110 A1* | 1/2014 | Knofe | ...................... | B25J 13/02 |
| | | | | 435/325 |
| 2015/0338875 A1* | 11/2015 | Aujay | ..................... | A63F 13/06 |
| | | | | 700/85 |

FOREIGN PATENT DOCUMENTS

| | | | |
|---|---|---|---|
| JP | 9-130918 | | 5/1997 |
| JP | 09130918 | A * | 5/1997 |
| JP | 09130918 | A * | 5/1997 |
| JP | 2010100389 | | 5/2010 |
| WO | 2000/054721 | | 9/2000 |

OTHER PUBLICATIONS

First Office Action from the State Intellectual Property Office of the People's Republic of China for Application No. 201480049541.1 dated Jan. 25, 2018 (15 pages).

* cited by examiner

REDUCED DEAD BAND FOR SINGLE JOYSTICK DRIVE VEHICLE CONTROL

RELATED APPLICATIONS

This application claims priority to U.S. Provisional Application No. 61/875,465, filed on Sep. 9, 2013, the entire contents of which are incorporated herein by reference.

BACKGROUND

The present invention relates to the use of a dead band in joystick control systems to reduce unintended movements.

SUMMARY

In one embodiment, the invention provides a single joystick drive system for controlling the movement of a vehicle with a reduced dead band. A vehicle can include, for example, a front-loader, a crane, or a remote-control vehicle. In a voltage-based joystick, modification of the dead band may be achieved in a controller by altering voltage or current parameters. In a joystick with a processed output, the dead band modification may be achieved by altering the output. Also, the dead band modification may be accomplished mechanically by altering the mechanics of the joystick.

In one embodiment, the invention provides a system for controlling a vehicle using a joystick with an X axis and a Y axis. The joystick is configured to output a position signal indicative of a position of a joystick handle relative to a base of the joystick. A dead band region of the joystick extends from an origin of the joystick handle to a region around the origin, which represents an area of travel of the joystick handle where the position signal is indicative of the origin. A controller implements the dead band region such that a control signal to the vehicle is maintained at a level indicative of the origin. This prevents unwanted movements of the vehicle based on small unintentional movements of the joystick handle.

In another embodiment, the invention provides a method of controlling the movement of a vehicle using a single joystick drive with reduced dead band. The dead band of the joystick is limited to specific regions of joystick handle positions in order to provide a more responsive steering control. The method includes outputting a position signal indicating the position of the joystick handle relative to the base and maintaining a dead band region, which extends from an origin of the joystick handle to a region around the origin. This dead band region represents an area of travel of the joystick handle where the position signal indicates that the joystick handle is at the origin. The control signal is maintained at a level indicative of the origin of the joystick handle.

In another embodiment, the invention provides a system for controlling a vehicle including a joystick and a controller. The joystick has a base and a joystick handle that is moveable relative to the base. The joystick is configured to output a position signal indicative of an X-axis position of the joystick handle relative to an X-axis origin position and a Y-axis position of the joystick handle relative to a Y-axis origin position. The controller is electronically coupleable to the joystick and is configured to receive the position signal from the joystick. The controller then determines an X-axis dead band width based on the Y-axis position of the joystick handle and determines whether the X-axis position of the joystick handle is within the X-axis dead band width. The vehicle is operated based on the X-axis position when the X-axis position of the joystick handle is outside of the determined X-axis dead band width. However, the vehicle is operated based on an X-axis position equal to an X-axis dead band default value when the X-axis position of the joystick handle is within the determined X-axis dead band width.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
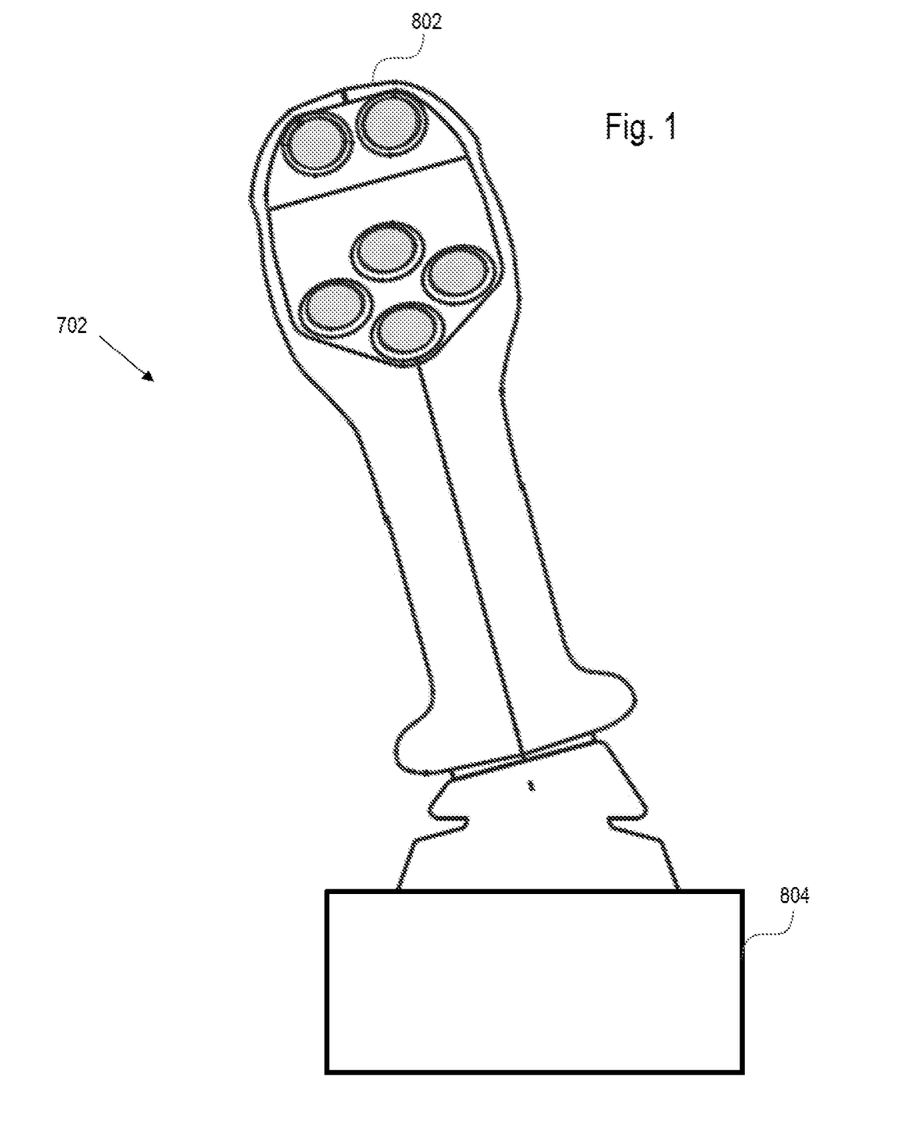
FIG. 1 is an elevation view of a joystick according to one embodiment.

FIG. 1 illustrates an example of a joystick 702 that includes a joystick handle 802 and a base 804. In various system, for example, a front-loader vehicle (e.g., skid steer loader or compact track loader), the joystick handle 802 is manipulated to move relative to the based 804 to control the movement and operation of the system. The joystick 702 outputs a position signal indicative of the position of the handle 802 relative to the base 804. This position signal typically defines the current displacement of the joystick handle 802 from a home origin position in either Cartesian or radial coordinates. Although the examples described, below refer primarily to Cartesian coordinates (i.e., (x, y)), various aspects of the system can be adapted to function with radial coordinate systems.

Figure 2:
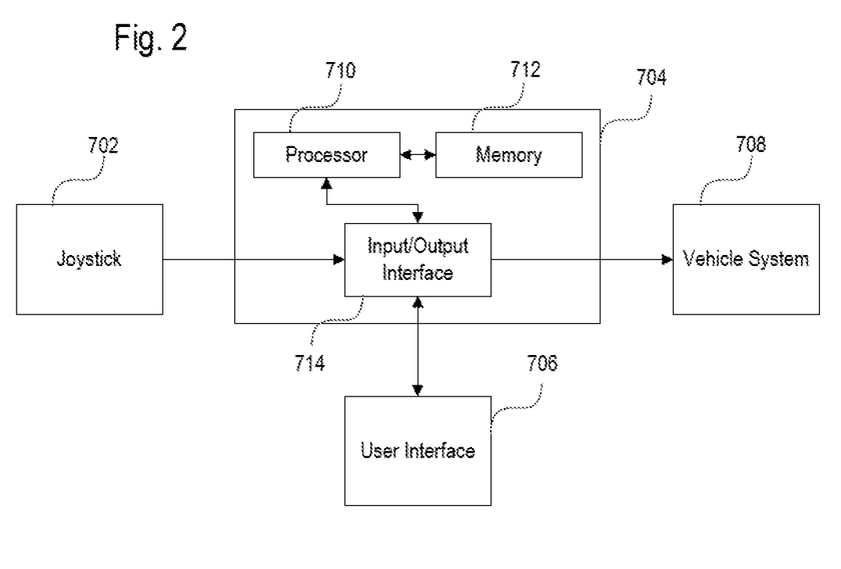
FIG. 2 is a block diagram of a control system for the joystick of FIG. 1.

As illustrated in FIG. 2, the joystick 702 outputs the position signal to a controller 704 as a voltage signal, a current signal, digital serial output, or other control signal. The controller 704 includes a processor 710, a memory 712, and an input/output interface 714. Once the position signal is received from the joystick, the controller 704 operates a vehicle system 708 based on the position signal from the joystick (e.g., by sending a control signal). The vehicle system 708 can include, for example a wheel or engine control system that performs the drive action of the front-loader vehicle. The controller 704 also communicates with a user interface 706 that allows the user to input information such as adjustments to joystick dead bands as described in further detail below.

In some constructions, the controller 704 is implemented specifically as a joystick controller and may be housed within the base 804 of the joystick itself. In other constructions, the controller 704 is implemented as part of a general vehicle control system and is housed separately from the joystick.

When operating a vehicle (or other system) using a joystick control, the joystick will occasionally experience unintentional movements from the user. For example, when a driver positions the joystick handle upward along the Y-axis (i.e., intending to move the vehicle forward and straight), it can be difficult physically to keep the joystick handle from moving, left or right. A dead band can be used to define a region in which movements of the joystick will not register or affect the output performance of the system.

Figure 3:
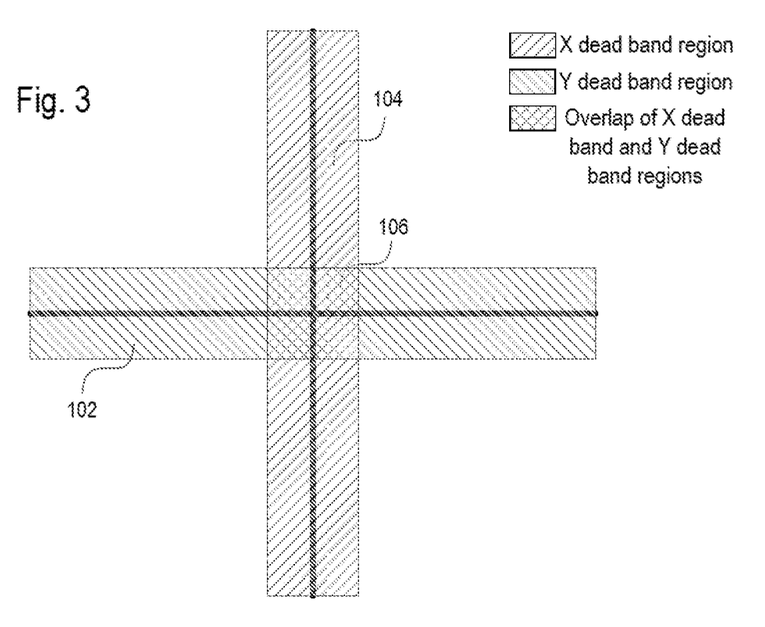
FIG. 3 is a graph of a uniform +/−8% dead band for the joystick of FIG. 1.

FIG. 3 illustrates an example of a uniform dead band region along each of the X and Y axes. Each dead band region is centered along an origin position of the joystick handle and extends approximately +/−8% from an origin position of the joystick handle (i.e., 8% of the maximum travel distance of the joystick handle). The X-axis dead band region 104 stretches along the entire length of the Y-axis and the Y-axis dead band region 102 stretch along the entire length of the X-axis.

The Y-axis dead band region 102 defines a plurality of joystick handle 802 positions where the system operated by the joystick will operate as though the joystick handle 802 is positioned at a Y-axis origin position (e.g., Y=0). Any up or down movement of the joystick handle within the width of the Y-axis dead band region will not result in any movement of the vehicle in the forward or backward directions. If the joystick handle 802 is positioned above this region, the vehicle will move forward. If the joystick handle 802 is positioned below this region, the vehicle will move backward.

Similarly, the X-axis dead band region 104 defines a plurality of joystick handle 803 positions where the system operated by the joystick will operate as though the joystick handle 802 is positioned at the X-axis origin position (e.g. X=0). Any left or right movements of the joystick within the width of the X-axis dead band region will not register. However, if the joystick handle 802 is positioned to the left or right of this region, the vehicle will steer accordingly. As also illustrated in the example of FIG. 1, the X-axis dead band and the Y axis dead band overlap at region 106. Any movements of the joystick handle 802 that are limited within this overlap region 106 will not result in any movement of the vehicle.

However, using uniform dead bands along the entire X and Y axis can also reduce steering control when used for driving a front-loader vehicle. For example, if the front-loader vehicle is moving forward and turning left (i.e., the joystick handle is positioned in the upper left quadrant) and the driver wants the front-loader vehicle to move forward and turn right, he or she needs to move the joystick handle across the entire X axis dead band region for the joystick to respond. As a result, the joystick system will operate as though the X-axis position of the joystick is at the origin position (i.e., X=0) for the entire time that the joystick is moved from left to right across the X-axis dead band. This may result in jerky, choppy movement of the vehicle.

Figure 4:
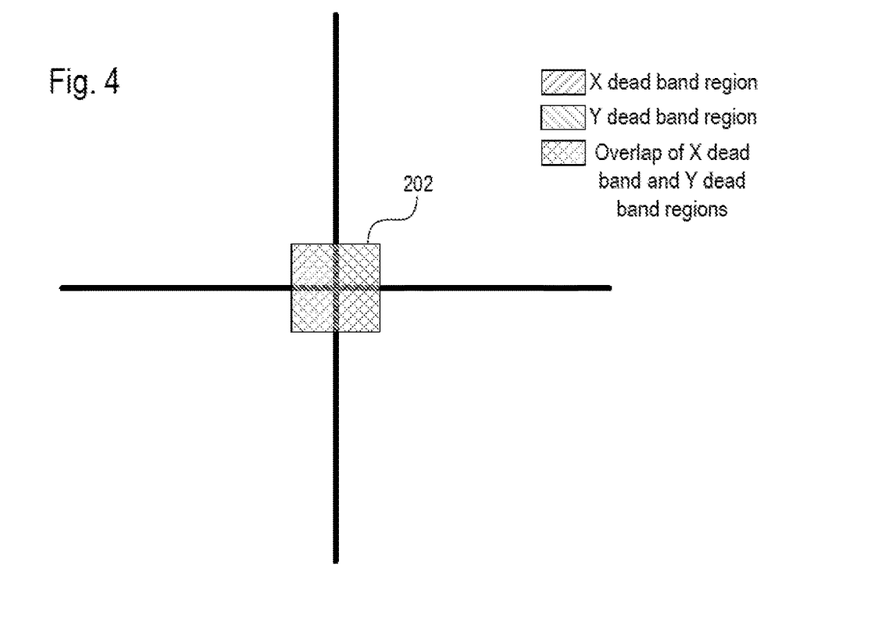
FIG. 4 is a graph of a uniform dead band for the joystick of FIG. 1 with a limited range.

FIG. 4 illustrates an embodiment of the invention of a joystick 702 with a +/−8% dead band that does not extend the full length of the axes. The 8% represents 8% of the maximum distance of travel of the joystick handle 802. The X and Y axis dead band 202 is the region of joystick handle 802 positions where the joystick 702 will not register any movement in the vertical or horizontal directions. If the joystick handle 802 is positioned in this region, the vehicle will not move. When the joystick handle 802 is positioned outside the X and Y axis dead band 202, all horizontal and vertical movement of the joystick 702 will be registered and the vehicle will move accordingly.

Figure 5:
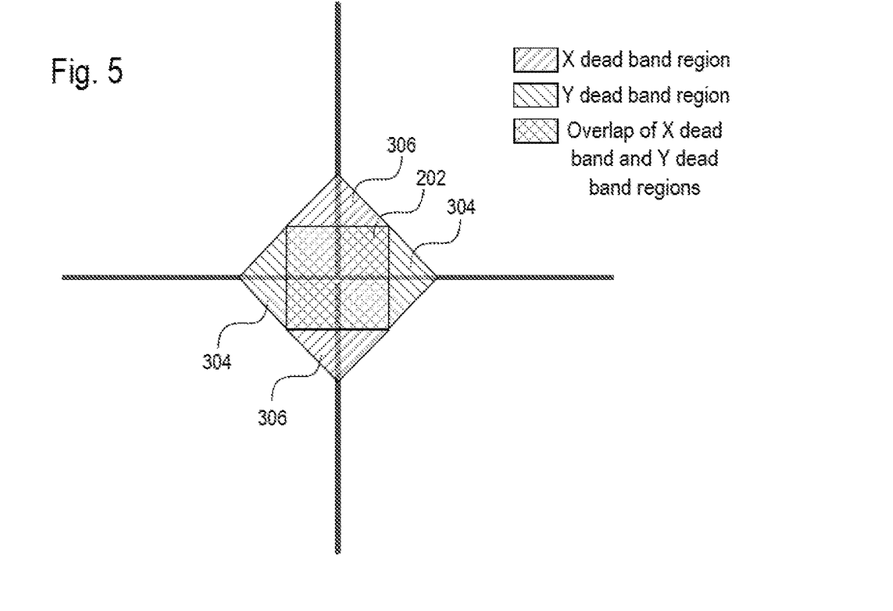
FIG. 5 is a graph of a variable width, transition-to-zero dead band with 8% of additional travel for the joystick of FIG. 1.

FIG. 5 illustrates an example of another set of dead band regions that may be implemented by a joystick system. The example of FIG. 3 implements a transition-to-zero dead band during 8% (TTZ 8%) of additional travel beyond the overlapping dead band region 202. Thus, X-axis dead band region provides a varying dead band width across a range of Y-axis positions extending out to a distance of 16% of the total travel distance of the joystick handle 702 in the Y-axis direction. The intersection of the X and Y axis dead baud 202 is similar to FIG. 2. However, in the example of FIG. 3, the X and Y axis dead bands each taper to a point along the respective axis. As such, the width of the X dead band is determined based on the Y-axis position of the joystick and the width of the Y dead band is determined based on the X-axis position of the joystick. The Y-axis TTZ 8% dead band 304 are the regions of joystick handle 802 positions where the joystick 702 will not register any movement in the forward or backward directions. If the joystick handle 802 is positioned in either region, the vehicle will only turn left or right. The X-axis TTZ 8% dead band 306 are two regions of joystick handle 802 positions where the joystick 702 will not register any movement in the left or right directions. If the joystick handle 802 is positioned in either region, the vehicle will only move forward or backward.

Figure 6:
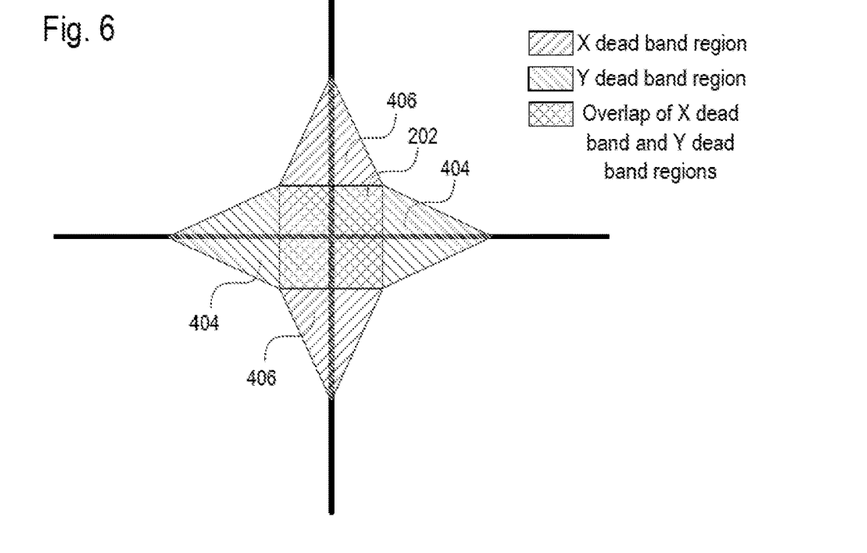
FIG. 6 is a graph of a variable width, transition-to-zero dead band with 24% of additional travel for the joystick of FIG. 1.

FIG. 6 illustrates an embodiment of the invention of a joystick 702 with a transition-to-zero dead band during 24% (TTZ 24%) of additional travel. Thus, the dead band extends out to a distance of 32% of the total travel distance of the joystick handle 702. Again, the width of the X dead band is determined based on the Y-axis position of the joystick and the width of the Y dead band is determined based on the X-axis position of the joystick. The Y axis TTZ 24% dead band 404 are the regions of joystick handle 802 positions where the joystick 702 will not register any movement in the forward or backward directions. If the joystick handle 802 is positioned in either region, the vehicle will only turn left or right. The X axis TTZ 24% dead band 406 are two regions of joystick handle 802 positions where the joystick 702 will not register any movement in the left or right directions. If the joystick handle 802 is positioned in either region, the vehicle will only move forward or backward.

Figure 7:
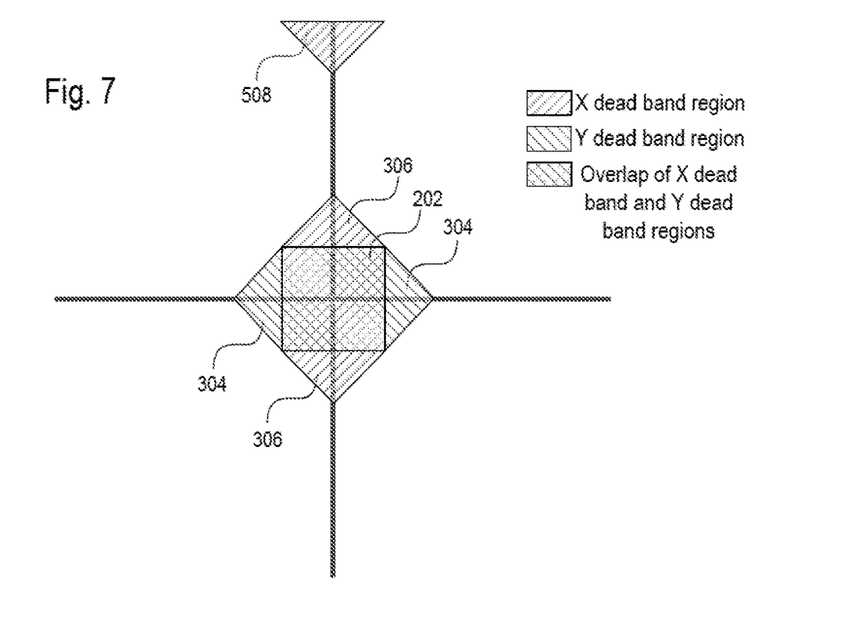
FIG. 7 is a graph of a variable width, transition-to-zero dead band with 8% of additional travel and a transition to +/−8% dead band at the end of travel for forward-straight tracking for the joystick of FIG. 1.

FIG. 7 illustrates an embodiment of the invention of a joystick 702 with a transition-to-zero dead band during 8% of additional travel and a transition to +/−8% dead band at the end of travel for forward-straight tracking. This embodiment is similar to the embodiment of FIG. 3 but includes a third region X axis dead band 508. In this third X axis dead band region 508, the vehicle will move forward at maximum speed and have dead band to prevent unintentional movement affecting straight tracking.

It is to be understood that the shape of the dead band and the percentage values of additional travel for the transition-to-zero dead band included in FIGS. 2-5 are just examples. The shape of the dead band and the percentage value of additional travel for the transition-to-zero dead band are adjustable and may be determined based on the mechanical and/or electrical characteristics of the joystick 702 and the type of machine being controlled. For example, the shape of the dead band may take the form of a rectangular area, a circular area, a cross-shaped area, a diamond-shaped area, a star-shaped area, and an oval-shaped area. Additionally, the joystick 702 may have multiple dead bands that are separate and distinct from each other and located anywhere within the area of travel of the joystick handle 802. The output of the joystick handle 802 in a given direction may be suppressed independently of other directions by setting that coordinate value equal to zero as shown below.

Figure 8:
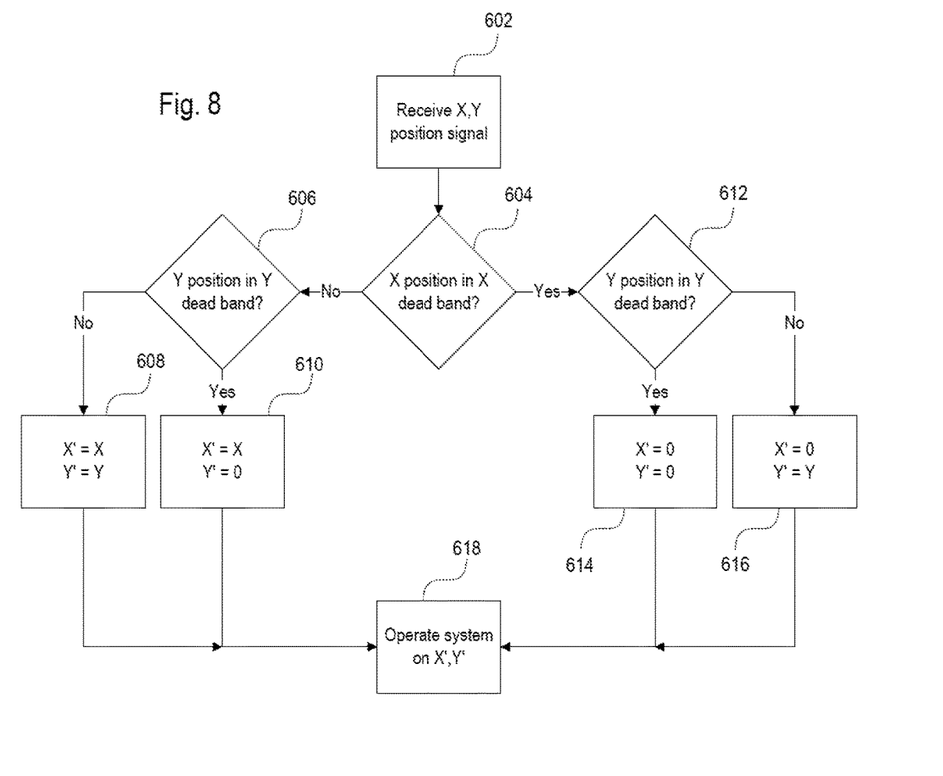
FIG. 8 is a flowchart of a method of control for a joystick.

FIG. 8 illustrates a drive control mechanism for a joystick 702 using any one of the dead band region arrangements illustrated in FIGS. 3-7. The drive control method uses a position signal with X and Y coordinates to identify the location of the joystick handle 802. The controller receives the position signal from the joystick (including X and Y position coordinates) (step 602). If the X-axis position of the joystick handle is not within the X dead band region (step 604) and the Y-axis position of the joystick handle is not within the Y dead band region (step 606), then the controller makes no modification to the X and Y position coordinates received from the joystick (step 608) and operates the vehicle system accordingly (step 618).

If the X-axis position of the joystick handle is not within the X dead band region (step 604), but the Y-axis position of the joystick handle is within the Y dead band region (step 606), then the controller overwrites the Y-axis position value to equal the value indicative of the Y-axis origin position of the joystick (in this case Y=0) while leaving the X-axis position coordinate unmodified (step 610). Similarly, if the X-axis position of the joystick is within the X dead band region (step 604), but the Y-axis position of the dead band is not with the Y dead band region (step 612), then the controller sets the X-axis position value to equal the value indicative of the X-axis origin position of the joystick (in this case X=0) while leaving the Y-axis position coordinate unmodified (step 616). Lastly, if both the X-axis position and the Y-axis position are within the respective dead bands (steps 604, 612), then the controller operates the vehicle system as those the joystick were positioned at the origin position on both coordinates (i.e., X=0 and Y=0) (step 614).

Thus the invention provides, among other things, a vehicle control system that includes a joystick and is operated within a variable width dead band over only a limited range of the opposing axis.

What is claimed is:

1. A system for controlling a vehicle comprising:
    a joystick including a base and a joystick handle movable relative to the base, the joystick configured to output a position signal indicative of an X-axis position of a moveable joystick handle relative to an X-axis origin position and a Y-axis position of the moveable handle relative to a Y-axis origin position; and
    a controller electronically coupleable to the joystick and configured to
        receive the position signal from the joystick,
        determine an X-axis deadband width based on the Y-axis position of the joystick handle and a second X-axis deadband region, wherein the second X-axis deadband region includes an X-axis deadband width for each Y-axis position within a second Y-axis range, and wherein the second Y-axis range extends from a maximum Y-axis travel distance of the joystick handle to a Y-axis position between the maximum Y-axis travel distance and the Y-axis origin position,
        determine whether the X-axis position of the joystick handle is within the determined X-axis deadband width,
        operate the vehicle based on the X-axis position when the X-axis position of the joystick handle is outside of the determined X-axis deadband width, and
        operate the vehicle based on an X-axis position equal to a X-axis deadband default value when the X-axis position of the joystick handle is within the determined X-axis deadband width,
        wherein, according to the X-axis deadband region, the X-axis deadband width equals zero at an end of the Y-axis range, and
        wherein the controller determines the X-axis deadband width based on the Y-axis position of the joystick handle by determining an X-axis deadband region that includes a deadband width for each Y-axis position within a Y-axis range, wherein the Y-axis range is centered at the Y-axis origin position.

2. The system of claim 1, wherein the X-axis deadband default value is a value indicative of the X-axis origin position of the joystick handle.

3. The system of claim 1, wherein the controller includes an electronic vehicle control system.

4. The system of claim 1, wherein the X-axis deadband width of the X-axis deadband region decreases as a distance between the Y-axis position of the joystick handle and the Y-axis origin position of the joystick handle increases.

5. The system of claim 1, wherein the controller is housed within the base of the joystick.

6. The system of claim 1, wherein the Y-axis range of the X-axis deadband region is adjusted based on a deadband range input received from a user input.

7. The system of claim 1, wherein the controller includes a processor and a memory storing instructions that, when executed by the processor, control operation of the controller.

8. The system of claim 1, wherein the Y-axis range extends in either direction from the Y-axis origin position to a distance less than or equal to 16% of a maximum Y-axis travel distance of the joystick handle.

9. The system of claim 1, wherein the controller is further configured to
    determine a Y-axis deadband width based on the X-axis position of the joystick handle,
    determine whether the Y-axis position of the joystick handle is within the determined Y-axis deadband width, operate the vehicle based on the Y-axis position when the Y-axis position of the joystick handle is outside of the determined Y-axis deadband width, and operate the vehicle based on an Y-axis position equal to a Y-axis deadband default value when the Y-axis position of the joystick handle is within the determined Y-axis deadband width.

10. The system of claim 9, wherein the Y-axis deadband default value is a value indicative of the Y-axis origin position of the joystick handle.

11. The system of claim 1, wherein the X-axis deadband region is defined by a shape selected from a group consisting of a rectangle, a circle, a cross, a diamond, a four-pointed star, and an oval.

* * * * *